Figure 2:
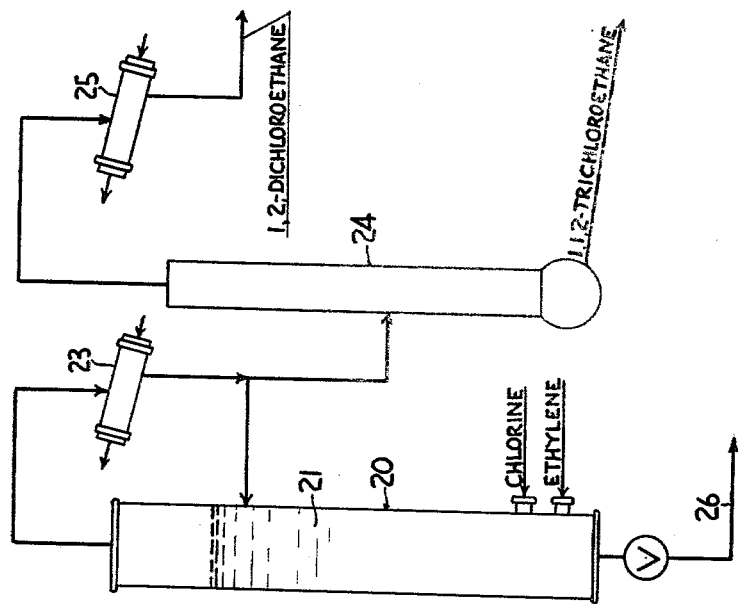

March 16, 1965  C. R. REICHE ETAL  3,173,963
CHLORINATED HYDROCARBON PRODUCTION
Filed Aug. 29, 1960

INVENTORS
CHARLES R. REICHE and
HARVEY J. VOGT
BY
Oscar L. Spencer
ATTORNEY

3,173,963
CHLORINATED HYDROCARBON PRODUCTION
Charles R. Reiche and Harvey J. Vogt, Corpus Christi, Tex., assignors, by mesne assignments, to Pittsburgh Plate Glass Company
Filed Aug. 29, 1960, Ser. No. 52,397
5 Claims. (Cl. 260—660)

This invention deals with the manufacture of 1,1,2-trichloroethane. More particularly, it concerns the production of such trichloroethane from ethylene and chlorine.

United States Letters Patent 2,174,737 reports the preparation of 1,1,2-trichloroethane by reacting 1,2-dichloroethane and chlorine in a liquid reaction bath irradiated with actinic light. For example, the patent uses some 21 mercury vapor lamps to provide the actinic light utilized in producing 150 to 170 pounds per hour of 1,1,2-trichloroethane. In addition, heat evolved by the lamps was removed by cooling.

Another procedure, according to United States Letters Patent 2,621,153, reacts 1,2-dichloroethane and chlorine in the vapor phase.

Still another procedure is described by United States Letters Patent 2,140,548 in which chlorine and 1,2-dichloroethane are reacted at temperatures of 400° C. to 480° C. in a molten metal chloride bath. According to the patent, considerable concentrations of more highly chlorinated products than 1,1,2-trichloroethane are encountered.

These aforedescribed procedures have various limitations. One procedure relies upon a large number of light sources and problems attendant their use. Another requires gas phase. The third, besides producing considerable quantities of other highly chlorinated products, requires handling of a molten metal bath.

In accordance with the present invention, 1,1,2-trichloroethane is most efficiently produced by a method which does not suffer from such limitations. Moreover, 1,1,2-trichloroethane is prepared without the coproduction of highly chlorinated ethanes, e.g., tetrachloroethanes and pentachloroethanes. Thus, the present invention permits the conversion of ethylene almost exclusively to 1,1,2-trichloroethane. In the alternative, it provides 1,1,2-trichloroethane and 1,2-dichloroethane without substantial coproduction of higher chlorinated ethanes.

These and other desirable ends are achieved in accordance with the present invention by introducing appropriate proportions of elemental chlorine and ethylene into a liquid body of 1,1,2-trichloroethane highly diluted with 1,2-dichloroethane. Thus, it has now been discovered that 1,1,2-trichloroethane may be manufactured with unusual effectiveness from elemental chlorine and ethylene when the 1,1,2-trichloroethane is produced in a liquid reaction medium containing 1,1,2-trichloroethane so diluted with 1,2-dichloroethane that the liquid body contains upwards of 5 percent but not substantially in excess of 25 percent 1,1,2-trichloroethane by weight of both the trichloroethane and dichloroethane. This degree to which 1,1,2-trichloroethane is diluted with 1,2-dichloroethane to provide the liquid reaction medium is most important.

In accordance with one embodiment hereof, 1,1,2-trichloroethane is produced by feeding appropriate mole proportions of elemental chlorine and ethylene (usually approximately two moles of chlorine per mole of ethylene) to a liquid medium containing metal chloride such as ferric chloride which liquid medium at the outset of the reaction is provided by charging 1,2-dichloroethane and 1,1,2-trichloroethane in proportions such that the resulting liquid medium contains no less than 5 percent and not substantially in excess of 25 percent of the trichloroethane by weight of the trichloroethane and dichloroethane.

After initiating the feed of reactants to the reaction medium and commencing formation of 1,1,2-trichloroethane, a portion of the liquid reaction medium is withdrawn, usually continuously, and its 1,1,2-trichloroethane content separated as by fractional distillation. The remaining organic components of this withdrawn liquid are returned to the reaction medium. Thus, the 1,2-dichloroethane content of the withdrawn stream after having been substantially separated from 1,1,2-trichloroethane is returned to the liquid reaction medium. The rate at which the liquid stream is withdrawn and 1,1,2-trichloroethane is separated from the liquid body is selected so as to maintain the rate of 1,1,2-trichloroethane withdrawn from the system substantially equivalent to the rate at which 1,1,2-trichloroethane is produced. In this fashion, the initial 1,2-dichloroethane content of the liquid reaction medium may be maintained substantially constant and buildup of 1,1,2-trichloroethane within the liquid reaction medium is not permitted.

A wide variety of temperature, pressure and other reaction conditions may prevail which are consistent with the performance of the invention in accordance with the aforedescribed embodiment. In one effective procedure, the liquid reaction body is maintained under conditions of pressure and temperature such that it is boiling, e.g., a considerable amount of organics including 1,2-dichloroethane vaporize from the liquid medium. Among other things, formation of 1,1,2-trichloroethane from ethylene and chlorine is accompanied by the evolution of considerable heat. By operating so that there is substantial volatilization of organic components from the liquid reaction medium while product is being formed therein, this heat of reaction may be partially or completely removed from the reaction body, thus providing temperature control.

Figure 1:
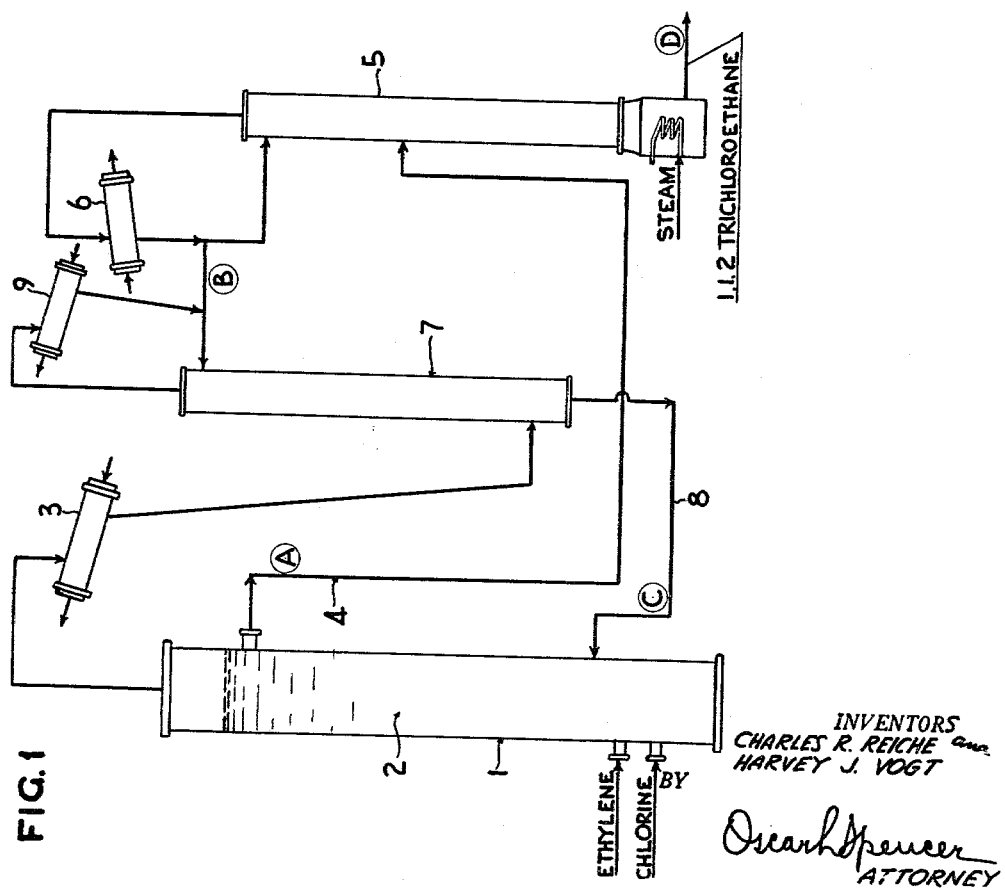

In FIGURE 1 of the accompanying drawing, one procedure for manufacturing 1,1,2-trichloroethane according to this invention is illustrated diagrammatically.

At the outset, from 3 to 19 parts by weight of 1,2-dichloroethane per part of 1,1,2-trichloroethane are charged to reactor 1 to provide liquid body 2. A minor amount of ferric chloride (typically about 0.006 percent by weight of the liquid body) is provided. Ethylene and chlorine are fed to a lower portion of liquid body 2 in essentially the stoichiometric proportions required for formation of 1,1,2-trichloroethane (about two moles of chlorine per mole of ethylene) and at a rate such that liquid body 2 reaches and maintains a boiling condition. Thus, liquid body 2 is at a temperature (at its liquid-gas interface) corresponding to the boiling point of the liquid reaction medium under the prevailing pressure. At atmospheric pressure, this approximates the normal boiling temperature of the liquid medium. If superatmospheric pressures prevail, liquid body 2 is at higher temperatures. In any event, the temperature and pressure conditions are such that liquid body 2 is near or at boiling condition.

With liquid body 2 boiling, the vapors of 1,2-dichloroethane along with hydrogen chloride are evolved. These vapors are withdrawn from reactor 1 and cooled in condenser 3 to liquefy the organic content, principally 1,2-dichloroethane. Hydrogen chloride remains uncondensed as it is vented or otherwise withdrawn from this reaction system. This cooled dichloroethane, free from most if not all of the hydrogen chloride with which it was withdrawn in gaseous state from reactor 1, is ultimately recycled to reactor 1.

Product is recovered from liquid reaction body 2 by continuously withdrawing liquid stream 4, as indicated in the drawing, and forwarding it for purification to still 5. The composition of this liquid stream corresponds to that of the liquid reaction medium and hence it contains 1,2-dichloroethane and 1,1,2-trichloroethane in the proportions they are maintained in liquid body 2, notably from 3 to 19 parts dichloroethane per part of 1,1,2-trichloroethane by weight.

Still 5 is operated, usually at atmospheric pressure, such that 1,2-dichloroethane and 1,1,2-trichloroethane are separated. Underflow from still 5 is thus comprised of 1,1,2-trichloroethane and any higher boiling component, e.g., for all practical purposes only with any chlorinated ethanes boiling above the trichloroethane. Overhead from product column 5, the components of product stream 4 boiling below 1,1,2-trichloroethane (principally 1,2-dichloroethane) are removed and cooled to condense their organic components in condenser 6. This liquid organic composition, predominantly 1,2-dichloroethane, is returned (indirectly in the manner hereinafter described) to reactor 1. A portion of the condensate from condenser 6 may be returned as reflux to column 5. In addition, inerts, notably hydrogen chloride, may be vented from condenser 6.

The recycle to liquid body 2 of 1,2-dichloroethane provided in condensers 3 and 6 may be accomplished with particular effectiveness in the manner illustrated in FIGURE 1 of the drawing. In the illustrated procedure, the 1,2-dichloroethane rich condensate from condenser 3 is fed to a lower portion of packed absorber 7 while a portion of the 1,2-dichloroethane rich condensate from condenser 6 is fed to the upper portion of the absorber. With such feeds, the absorber is operated so as to withdraw from its bottom and return to reactor 1 a liquid stream 8 having an organic composition which roughly corresponds to that of the organic condensates from condensers 3 and 6. Overhead from absorption column 7, gases are withdrawn, liquefied in condenser 9 and the organic condensates recycled as indicated in the drawing to the absorption column as reflux. Hydrogen chloride is not condensed in condenser 9, but instead is vented.

Thus, 1,1,2-trichloroethane is produced most efficiently in a liquid reaction medium containing from 3 to 19 parts by weight of 1,2-dichloroethane per part by weight of 1,1,2-trichloroethane. Such ratio of chlorinated ethanes is maintained by removing 1,1,2-trichloroethane at a rate approximating its rate of formation in liquid body 2 while the 1,2-dichloroethane is not permanently removed. Substantially all the 1,2-dichloroethane withdrawn from the liquid reaction medium, either as vapors to maintain the desired temperature of the liquid reaction body or withdrawn in conjunction with the recovery of 1,1,2-trichloroethane, is returned.

The temperature control of liquid body 2 is not limited to reliance upon vaporization; instead, a portion or even all the heat may be removed by heat exchange with coolants through the use of a jacketed reactor, cooling coils in the liquid body, and the like.

Moreover, in lieu of or in conjunction with removing 1,1,2-trichloroethane for the purposes of product recovery as a liquid stream, 1,1,2-trichloroethane may be recovered by fractionating the condensed vapors withdrawn overhead from reactor 1 while operating with liquid body 2 at elevated boiling temperatures. However, even when the trichloroethane concentration in liquid body 2 is at the tolerable maximum, the evolved vapors are rather lean in 1,1,2-trichloroethane. The total organic condensate of the overhead gas stream from reactor 1 has a 1,1,2-trichloroethane content substantially below that of the 1,1,2-trichloroethane content in liquid body 2. A considerable distillation burden must, accordingly, be borne by this procedure. However, in procedures involving the coproduction of 1,2-dichloroethane (as will hereinafter be discussed in further detail), this burden becomes less significant since it is utilized in conjunction with the 1,2-dichloroethane purification.

The following example illustrates the performance of the present invention according to the embodiment schematically described in FIGURE 1 of the drawing:

EXAMPLE I

The apparatus is assembled substantially as described schematically in FIGURE 1. Initially, reactor 1 provided by a nickel column 33 feet high and 3 inches in diameter is filled with sufficient 1,2-dichloroethane and 1,1,2-trichloroethane in the ratio of 3 parts by weight of 1,2-dichloroethane per part of 1,1,2-trichloroethane to provide a liquid body filling the bottom 30 feet of the column. Approximately 0.006 percent ferric chloride by weight of these chloroethanes is also charged. Gaseous ethylene (2.3 pounds per hour) and gaseous elemental chlorine (11.6 pounds per hour) are then introduced separately into the lower portion of reactor 1 well below the liquid-gas interface of liquid body 2 while establishing a pressure of 22 pounds per square inch gauge in the reactor. The heat evolved in the formation of chloroethanes rapidly raises temperatures to the point where the liquid body is boiling.

In this manner, liquid body 1 is established and thereafter maintained at a temperature of about 116° C. at its lower portion and a temperature of about 107° C. near or at its liquid-gas interface. Considerable quantities of 1,2-dichloroethane along with coproduced hydrogen chloride and minor quantities of other constituents present in the liquid reaction body are thus continuously being evolved as gases.

These gases evolve from the liquid body at a rate such that their vaporization absorbs substantially all the heat evolved in the formation of 1,1,2-trichloroethane. So evolved gases are withdrawn from the liquid reaction body and reactor while trichloroethane is being formed in the liquid reaction body and are condensed by cooling in condenser 3 to a temperature of about 32° C. Ultimately, the organic condensate is returned to the reactor.

Meanwhile, liquid stream 4 is continuously withdrawn at the rate of 44 pounds per hour from the reactor. Stream 4 has a composition A corresponding approximately to the composition of liquid body 2.

Stream 4 is forwarded to an intermediate portion of distillation column 5 operated at substantially atmospheric pressure comprising a 42 foot high steel column 4 inches in diameter and packed with ½ inch stainless steel rings. A steam heated reboiler is provided at the bottom of column 5 to maintain a bottom temperature of about 120° C. and an overhead temperature of about 84° C. Withdrawn from the bottom of distillation column 5 is the product stream. This stream is cooled in water cooled condenser to a temperature of about 25° C. and collected at the rate of 11.9 pounds per hour. It has an average composition D.

Overhead from distillation column 5 is liquefied in water cooled nickel condenser 6 to a temperature of about 32° C. Vented from condenser 6 is any hydrogen chloride present within stream 4 withdrawn from reactor 2. A portion of the condensate in condenser 6 is recycled to distillation column 5 as reflux. The balance (32.1 pounds per hour) of composition B is sent forward into an upper portion of absorber 7, a 20 foot high nickel column 3 inches in diameter, packed with ¼ inch nickel Lessing rings.

Fed into the bottom of absorber 7 operated at about 32° C. are the condensed vapors evolved from liquid body 2. Any organics escaping absorber 7 are condensed in cooler 9 and recycled to the top of absorber 7 as diagrammatically illustrated. Uncondensed hydrogen chloride present is vented from the system in condenser 9. Hydrogen chloride is vented from condenser 6 and cooler 9 at the rate of about 2 pounds per hour.

The liquid stream withdrawn from the bottom of absorber 7 has a composition C and is recycled to a lower portion of liquid body 2.

The following Table I gives the aforementioned compositions for A, B, C and D in tabular form:

Table I

| Chlorinated Ethane | Stream Composition, Weight Percent | | | |
|---|---|---|---|---|
| | A | B | C | D |
| 1,1-dichloroethane | <0.1 | 1.07 | 0.32 | |
| 1,2-dichloroethane | 72.8 | 94.4 | 92.8 | <0.1 |
| 1,1,2-trichloroethane | 24.1 | 3.33 | 5.23 | 88.4 |
| Tetrachloroethane | 1.9 | <0.1 | 0.31 | 7.31 |
| Pentachloroethane | 1.0 | | 0.44 | 4.24 |

Essentially pure 1,1,2-trichloroethane may be obtained from the liquid product stream of composition D by simple fractionation in a column operated such that the trichloroethane is taken overhead and the more highly chlorinated tetrachloroethane and pentachloroethane concentrate is in the underflow.

Both 1,1,2-trichloroethane and 1,2-dichloroethane may be jointly produced wthin the contemplation of this invention. This involves feeding ethylene and chlorine into a liquid reaction body comprising 1,2-dichloroethane and 1,1,2-trichloroethane in the aforementioned proportions while regulating the mole ratio at which the reactants are introduced.

In accordance with a further embodiment hereof, 1,1,2-trichloroethane and 1,2-dichloroethane are produced simultaneously. This is accomplished by proportioning the ratio of chlorine and ethylene so that substantially more than one mole but less than two moles of chlorine per mole of ethylene (usually 1.2 to 1.8 moles of chlorine per mole of ethylene) are introduced into the liquid reaction medium. The concentration of ferric chloride or like metal chlorides may also require some attention, preferably being maintained in concentrations of 0.006 percent to 0.05 percent or possibly as high as 0.15 percent by weight of the liquid bottom.

In the cojoint production of 1,1,2-trichloroethane and 1,2-dichloroethane, the vapors volatilized from the liquid reaction body contain an appreciable concentration of dichloroethane and a smaller concentration of 1,1,2-trichloroethane. These vapors are condensed, the hydrogen chloride remaining in gaseous state, and a portion of the resulting condensate is sent forward for purification. The balance of the condensate is recycled to the liquid reaction medium. Thus, dichloroethane is recovered from the reaction medium substantially free of ferric chloride or like metal chlorides by utilizing the heat evolved in preparing the products.

From the portion of organic condensate both the products may be resolved into a relatively pure state by fractionation. However, under certain conditions of operation, notably when the liquid reaction medium contains above 5 weight percent but not substantially more than 10 or 15 weight percent 1,1,2-trichloroethane by weight of the organic content of the liquid body, the 1,1,2-trichloroethane content of the withdrawn vapors is rather low. Should this prove inadequate, 1,1,2-trichloroethane may be recovered from the liquid reaction medium by withdrawing a liquid stream from the reactor for the purpose of separating 1,1,2-trichloroethane. This may serve as the sole expedient for recovering product. Often, however, 1,1,2-trichloroethane is recovered both by evolution in volatile form and by recourse to withdrawal of the liquid stream.

The following example illustrates the manner in which both 1,2-dichloroethane and 1,1,2-trichloroethane may be produced in accordance with this invention:

EXAMPLE II

As diagrammatically illustrated in FIGURE 2 of the drawing, joint production of 1,2-dichloroethane and 1,1,2-trichloroethane is accomplished by feeding 192.67 pounds per hour of elemental gaseous chlorine and 71.81 pounds per hour of ethylene (98 mole percent ethylene purity) into the lower portion of liquid body 21 in reactor 20. Liquid body 21 is established and maintained such that it is comprised mainly of 1,2-dichloroethane, but contains 8.4 weight percent 1,1,2-trichloroethane by weight of the dichloroethane. Ferric chloride in a concentration of about 0.006 weight percent of the liquid body is present. Liquid body 21 is maintained at its liquid-gas interface at about 84° C., essentially atmospheric conditions prevailing.

The temperature of liquid reaction body 21 is sustained by evolution of gases comprising principally 1,2-dichloroethane, 1,1,2-trichloroethane and hydrogen chloride.

These gases are continuously withdrawn and sent forward to condenser 23 where they are cooled to about 30° C., the organic constituents therein liquefying. Uncondensed hydrogen chloride is vented from the system leaving a liquid composition of 1,2-dichloroethane containing a minor concentration of 1,1,2-trichloroethane. About 80 percent by weight of condensate produced in condenser 23 is recycled to liquid body 21. The balance is sent forward to still 24.

In still 24, the liquid stream is resolved into an overhead fraction consisting essentially of 1,2-dichloroethane. This fraction is forwarded to condenser 25 and liquefied to provide 236.16 pounds per hour of 1,2-dichloroethane. Removed from the lower portion of still 24 is a liquid stream containing 1.15 pounds 1,2-dichloroethane, 19.52 pounds 1,1,2-trichloroethane, 1.8 pounds tetrachloroethane and 0.52 pound pentachloroethane per hour. Proper distillation techniques are suitable for further purifying the trichloroethane.

In the aforedescribed procedure in which 1,1,2-trichloroethane is recovered from liquid reaction body 21 by rectifying withdrawn evolved vapors thereof along with 1,2-dichloroethane, the recovery of 1,1,2-trichloroethane may be supplemented by withdrawing a liquid stream 26 from the reactor and rectifying the stream much in the manner the condensate from condenser 23 is rectified in column 24. In fact, liquid stream 26 may be combined with that portion of the condensate from condenser 23 fed to still 24.

The production of 1,1,2-trichloroethane from ethylene and chlorine in the liquid phase is influenced by the presence of metal chlorides such as ferric chloride. Thus, an appropriate concentration of ferric chloride or like metal chloride is provided in the liquid reaction medium. Typical ferric chloride concentrations range downwardly from 0.10 percent by weight to about 0.001 percent by weight of the liquid reaction body. As a rule, the lower ferric chloride concentrations facilitate the formation of 1,1,2-trichloroethane.

Undue amounts of water are detrimental. Hence, substantial absence of elemental oxygen and substantially anhydrous conditions are recommended. To this end, substantially anhydrous chlorine and ethylene are used and the reaction system is operated under airtight conditions. Metal catalyst (including makeup) is usually in substantially anhydrous form.

Both the ratio in which chlorine and ethylene are fed and the concentration of ferric chloride effect the ratio in which dichloroethane and trichloroethane are produced. As already indicated, too great concentrations of ferric chloride are not especially conducive to the formation of 1,1,2-trichloroethane. Thus, the literature reports the presence of substantial ferric chloride concentrations of say 0.25 percent ferric chloride by weight tend to inhibit the formation of 1,1,2-trichloroethane. Accordingly, it is usually preferable to operate in the presence of substantially lower ferric chloride or like metal chloride concentrations.

When the present invention is performed to produce principally 1,1,2-trichloroethane, chlorine and ethylene are fed in substantially the stoichiometric portions required for the formation of trichloroethane, notably about two moles of chlorine per mole of ethylene. Slight stoichiometric excess of either reactant is not fatal. Nevertheless, it is adviable to avoid any significant stoichiometric excess of chlorine since this prompts the formation of ethanes more highly chlorinated than trichloroethane. In those embodiments of the present invention where both 1,2-dichloroethane and 1,1,2-trichloroethane are cojointly produced, the mole ratio of reactants is such that less than two moles of chlorine per mole of ethylene are employed but greater than 1.05 moles of chlorine per mole of ethylene are charged to the reactor.

While the invention has been described by reference to specific details of certain illustrative embodiments, it is not intended that the invention be construed as limited to such details except insofar as they appear in the appended claims.

We claim:

1. A method of producing 1,1,2-trichloroethane which comprises feeding ethylene and chlorine into and forming 1,1,2-trichloroethane in a catalyst containing liquid body of 1,2-dichloroethane and 1,1,2-trichloroethane, the 1,1,2-trichloroethane content in the liquid body being from 5 to 25 percent by weight of the trichloroethane and dichloroethane.

2. A method of producing 1,1,2-trichloroethane which comprises feeding ethylene and chlorine into a catalyst containing liquid body of 1,1,2-trichloroethane and 1,2-dichloroethane, and producing 1,1,2-trichloroethane in said liquid body while maintaining from 3 to 19 parts by weight of 1,2-dichloroethane per part of 1,1,2-trichloroethane in the liquid body.

3. A method of producing 1,1,2-trichloroethane which comprises feeding ethylene and chlorine to a liquid body of 1,1,2-trichloroethane and 1,2-dichloroethane containing catalyst and producing 1,1,2-trichloroethane in the liquid body while maintaining a 1,1,2-trichloroethane content in the liquid body of from 5 to 25 percent by weight of the 1,1,2-trichloroethane and 1,2-dichloroethane.

4. The method of claim 3 wherein about two moles of chlorine per mole of ethylene are fed to the liquid body.

5. A method of producing 1,1,2-trichloroethane which comprises feeding chlorine and ethylene into a liquid body of 1,1,2-trichloroethane diluted with 1,2-dichloroethane and maintaining the 1,1,2-trichloroethane content in the liquid body from 5 to 25 percent by weight of said chloroethanes while therein forming 1,1,2-trichloroethane.

References Cited in the file of this patent

UNITED STATES PATENTS

| | | |
|---|---|---|
| 2,621,153 | Meyer et al. | Dec. 9, 1952 |
| 2,929,852 | Benedict | Mar. 22, 1960 |